(12) United States Patent
Schwabe

(10) Patent No.: US 6,462,535 B1
(45) Date of Patent: Oct. 8, 2002

(54) EDDY CURRENT SENSOR WITH A MODIFICATION COIL FOR REDUCING EXTENSIVE HEATING AND A METHOD FOR OPERATING SUCH AN EDDY CURRENT SENSOR

(75) Inventor: Michael Schwabe, Rimsting (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/676,848

(22) Filed: Sep. 29, 2000

(30) Foreign Application Priority Data

Sep. 30, 1999 (DE) .......................................... 199 46 931

(51) Int. Cl.[7] .............................. G01P 3/49; G01P 3/50; G01P 15/105; G01R 33/12
(52) U.S. Cl. ........................ 324/164; 324/162; 324/225; 324/232; 73/514.31; 73/514.39
(58) Field of Search ................................. 324/137, 160, 324/162–164, 173, 174, 207.12, 225, 232, 235, 239; 73/514.16, 514.31, 514.39, 519.01, 520.01

(56) References Cited

U.S. PATENT DOCUMENTS

| 4,441,077 A | * | 4/1984 | Dodgen et al. ............. 324/164 |
| 4,703,265 A | * | 10/1987 | Tornblom ................... 324/232 |
| 4,751,459 A | | 6/1988 | Stupak, Jr. |
| 4,879,531 A | | 11/1989 | Tigges et al. |
| 4,893,079 A | | 1/1990 | Kustra et al. |
| 5,331,278 A | * | 7/1994 | Evanson et al. ............ 324/232 |
| 5,386,642 A | | 2/1995 | Spies et al. |
| 5,430,374 A | | 7/1995 | Metz |
| 5,548,213 A | * | 8/1996 | Kohmura et al. ........... 324/232 |
| 5,627,466 A | | 5/1997 | Spies et al. |
| 5,747,995 A | | 5/1998 | Spies |
| 5,874,732 A | | 2/1999 | Giles |
| 6,111,402 A | | 8/2000 | Fischer |
| 6,288,536 B1 | | 9/2001 | Mandl et al. |

FOREIGN PATENT DOCUMENTS

| DE | 739 775 | 8/1943 |
| DE | 33 14 567 | 5/1984 |
| DE | 35 30 774 | 2/1987 |
| DE | 37 30 841 | 3/1988 |
| DE | 37 14 433 | 11/1988 |
| DE | 39 18 152 | 12/1990 |
| DE | 195 26 870 | 8/1996 |
| DE | 196 31 438 | 2/1998 |
| EP | 0 661 543 | 7/1995 |

* cited by examiner

Primary Examiner—Gerard R. Strecker
(74) Attorney, Agent, or Firm—Brinks Hofer Gilson & Lione

(57) ABSTRACT

An eddy current sensor including an arrangement for generating a first magenetic flux, which is essentially directed vertically with respect to a moved body, a detector coil for detecting an eddy field in the moved body and a second arrangement which generates a further adjustable magnetic flux, which is superimposed on the first magnetic flux to form a resultant magnetic flux.

23 Claims, 1 Drawing Sheet

EDDY CURRENT SENSOR WITH A MODIFICATION COIL FOR REDUCING EXTENSIVE HEATING AND A METHOD FOR OPERATING SUCH AN EDDY CURRENT SENSOR

Applicant claims, under 35 U.S.C. §119, the benefit of priority of the filing date of Sep. 30, 1999 of a German patent application Serial Number 199 46 931.9, filed on the aforementioned date, the entire contents of which is incorporated herein by reference.

BACKGROUND OF THE INVENTION

1. Field of the Invention

The present invention relates to a method for operating an eddy current sensor, wherein a first magnetic flux, which is essentially directed vertically with respect to a moved body, is generated by at least one device. The invention also relates to an eddy current sensor for executing the method.

2. Discussion of Related Art

Velocity or acceleration sensors based on the principle of measuring eddy currents are also called Ferraris or eddy current sensors. Permanent magnets induce voltages U in a moving, electrically conducting non-ferromagnetic body as a function of the velocity v, which cause eddy currents I as a function of the velocity. Changes in velocity dv/dt change the magnetic field generated by the eddy currents, because of which voltages U(dv/dt) are induced in detector coils.

Such an eddy current detector is known from DE 37 30 841 A1, which can be used as a speedometer or accelerometer. DE 37 30 841 A1 corresponds to U.S. Pat. No. 4,751,459, the entire contents of which are incorporated herein by reference. It contains a non-magnetic, electrically conductive body, whose velocity or change in velocity can be measured. A constant magnetic field is generated essentially vertically with respect to the direction of movement and leads to eddy currents in the moved body, which in turn generate an eddy current magnetic field. When used as a speedometer, the flow density of the eddy current field is measured by a Hall effect sensor, whose output signal represents the velocity. When used as an accelerometer, the change of the flow density of the eddy current field over time is measured by a coil, whose output signal is proportional to the acceleration. To concentrate the eddy current flow and to reduce interference effects, a separate magnetic circuit is used for the coil or the Hall effect sensor.

It is disadvantageous here that the moved body can move at very different velocities and that the current strength of the eddy current rises with the velocity. Since, because of the electrical resistance of the conductive moved body, the eddy current leads to thermal heating, the moved body can become very hot at high velocities. This also affects the eddy current field, which leads to inaccuracies in measurement.

A method and an arrangement is known from U.S. Pat. No. 4,893,079, the entire contents of which are incorporated herein by reference, wherein the effects of the temperature in an eddy current detector are corrected. An eddy current detector, in which measurement errors caused by a temperature change are compensated, is used in connection with an arrangement for measuring physical parameters of conductive materials. Circuitry is used for this, which connects the primary coils and reference coils of the eddy current detector either with an oscilloscope for displaying the eddy current, or with an ohmmeter for displaying the electrical resistance. A resistance change can be measured on the basis of a temperature change by this and can be taken into account in the determination of the eddy current.

Although it is possible by this to essentially compensate measuring inaccuracies in an eddy current sensor caused by temperature fluctuations, the disadvantage remains that the eddy current detector itself leads to warming because of the induced eddy currents and thereby worsens the measurement results. If the eddy current detector is moved rapidly, this effect is increased. However, it is not disclosed how warming, which is unavoidable because of the basic physical conditions in the measurement of eddy currents, can be reduced.

A rotational position measuring system is known from EP 0 661 543 B1, wherein the rotational acceleration is also measured. Two signal transmitters are connected in a torsion-proof manner with each other, and a signal detection unit is assigned to each signal transmitter. A first one of the two signal transmitters is produced by means of an optical or inductive graduation, which is scanned by a signal detection unit by an optical or inductive scanning head. A second signal transmitter includes an electrically conducting disk, through which a magnetic flux flows in a vertical direction. This magnetic flux can be generated by suitable magnets. If the disk is moved in relation to the magnet, eddy currents are created, which in turn generate a magnetic field. The change in the magnetic field is qualitatively detected by a signal detection unit, so that the measured value detected in the signal detection unit represents a value of the acceleration. The two signal transmitters are either arranged, each in the form of a separate disk, on a common torsion-proof shaft, or for position measuring the first signal transmitter is arranged directly on the edge of the second signal transmitter for acceleration measurement, because of which the disk diameter as a whole is increased.

In this case, it is disadvantageous that temperature problems are created at high numbers of revolution, since the magnetic flux must be of such a strength that an exact determination of the acceleration is also possible at slow accelerations and low numbers of revolution, which is only assured starting at a defined minimum value of the magnetic flux. However, this causes problems at high numbers of revolutions, since in that case the eddy currents caused in the second signal transmitter lead to very great heating of the signal transmitter. Since this greatly heated signal transmitter is made of metal in most cases, heating leads to a not inconsiderable expansion, which can result in a deformation of the first signal transmitter, if the latter is fastened directly on the outer edge of the second signal transmitter. The function of the first signal transmitter is negatively affected by this. If the first signal transmitter includes an optical graduation, which had been applied to glass, it could even be destroyed. No steps for preventing this heating are disclosed.

In summary, when an eddy current sensor is used as an acceleration detector, a problem arises in that a magnetic field of a large magnetic field strength is required for performing an accurate measurement at low velocities and slow accelerations. However, at large velocities and with great accelerations, large eddy currents are induced in the moved body, which lead to undesirably large heating.

OBJECT AND SUMMARY OF THE INVENTION

It is therefore an object and advantage of the present invention to design a Ferraris or eddy current sensor in such a way that it is possible to counteract the impermissible heating. Moreover, it is intended to produce the eddy current sensor compactly and cost-effectively.

This object and advantage is attained by a method for operating an eddy current sensor that includes generating a first magnetic flux, which is essentially directed vertically with respect to a moved body, generating eddy currents in the moved body in response to the first magnetic flux, wherein the eddy currents generate an eddy field, inducing a voltage in a detector as a result of a change of the eddy field and superimposing a further adjustable magnetic flux on the first magnetic flux to form a resultant magnetic flux.

The above objective and advantage is attained by an eddy current sensor including an arrangement for generating a first magnetic flux, which is essentially directed vertically with respect to a moved body, a detector coil for detecting an eddy field in the moved body and a second arrangement which generates a further adjustable magnetic flux, which is superimposed on the first magnetic flux to form a resultant magnetic flux.

The Ferraris or eddy current sensor in accordance with the present invention, and the method executed with the aid of it have the advantage that the field strength of the magnetic field, by which eddy currents are caused in the moved body, can be adapted as a function of the velocity of the moved body. Thus, there is no longer a constant magnetic field, as in the prior art, instead it is changed in accordance with the present invention, in particular as a function of the velocity.

Modification coils are advantageously provided, whose magnetic field is superimposed on that of the permanent magnets, and whose current is impressed as a function of the velocity. By this it is possible as a function of the velocity of the moved body to always set the optimal field strength of the magnetic field with which an exact acceleration measurement is possible, but where the moved body is not overly heated. It is therefore possible to always set the optimal field strength of the constant magnetic field.

It is furthermore possible to make the permanent magnets for generating the constant magnetic field smaller, since the constant magnetic field can not only be weakened by the additional coils, but also strengthened. This makes possible considerable improvements in regard to the weight and volume of the eddy current sensor. Moreover, the manufacture of the eddy current sensor becomes more cost-effective because of this.

Further advantages, as well as details of the eddy current sensor in accordance with the present invention, as well as of the method in accordance with the invention, ensue from the following description of the exemplary embodiments by means of the drawings.

DETAILED DESCRIPTION OF THE INVENTION

Figure 1:
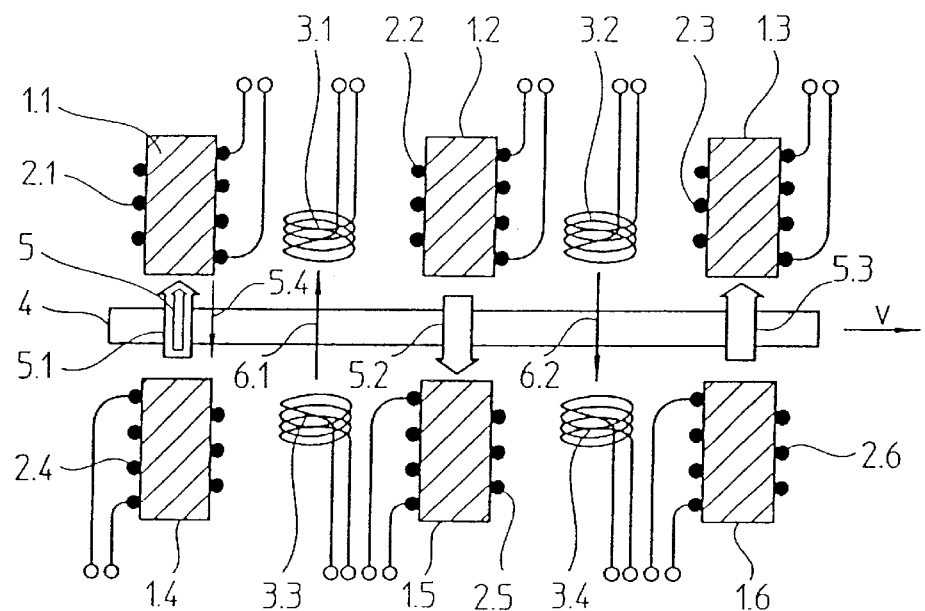
FIG. 1 represents a first embodiment of a Ferraris or eddy current sensor in accordance with the present invention.

A possible exemplary embodiment of a production in accordance with the present invention of a Ferraris or eddy current sensor is represented in FIG. 1. A permanent magnet arrangement 1.1 to 1.6 is shown in FIG. 1. A body 4 of an electrically conducting, non-ferromagnetic material is arranged between each of two permanent magnets 1.1 and 1.4, 1.2 and 1.5, 1.3 and 1.6, whose velocity, such as translational velocity v or angular velocity ω, or acceleration, such as translational acceleration or angular acceleration, is to be measured. The magnetic flux or fields 5.1 to 5.3 of the magnets 1.1 and 1.4, 1.2 and 1.5, 1.3 and 1.6 crosses essentially directed vertically with respect to the body 4 as represented by the broad arrows, in which velocity-dependent eddy currents and eddy fields 6.1, 6.2 resulting therefrom are generated as represented by the narrow arrows. Detector coils 3.1 to 3.4 detect the acceleration of the body 4 in that the voltage induced and generated at each one of the detector coils 3.1 to 3.4 is essentially directly proportional to the change of the amount of the flux density of the eddy current flow 6.1 and 6.2 or the change in the eddy fields over time, and therefore represents a direct measurement of the velocity change of the body 4 over time.

Since the eddy currents in the moved body 4 cause heating because of the ohmic resistance of the latter, and because the strength of the eddy currents is a function of the field strength of the magnetic fields 5.1 to 5.3 generated by the permanent magnets 1.1 to 1.6, as well as of the velocity, such as translational velocity v or angular velocity w, of the moved body 4, the moved body 4 can be extensively heated at high velocities. To prevent this extensive heating, at least one modification coil 2.1 to 2.6 is provided in accordance with the invention in order to superimpose a further adjustable magnetic flux or field 5.4 on the field strength of the constant magnetic fields 5.1 to 5.3 as a function of the velocity, such as translational velocity v or angular velocity ω, of the moved body 4. In the example, one of the modification coils 2.1 to 2.6 is assigned to each one of the permanent magnets 1.1 to 1.6. The magnetic fields 5.1 to 5.3 of the permanent magnets 1.1 to 1.6 and the magnetic fields 5.4 of the modification coils 2.1 to 2.6 are superimposed on each other and form a resultant magnetic flux or field 5 that generates further eddy currents in the body 4. The magnetic field 5, which causes the eddy currents 6.1, 6.2 in the moved body 4 when the latter is moving, is set as a function of the velocity. It is possible in this way to always induce eddy currents 6.1, 6.2 in the moved body 4, which are just strong enough to allow an accurate measurement of the acceleration by the eddy current sensor. For reasons of clarity, the magnetic fields 5.4 and this superimposition is only represented at one place in the drawings.

The current I through the modification coils 2.1 to 2.6 is set by a current regulator 7 (FIG. 2) in such a way that, at a low velocity v of the body 4, the magnetic fields 5.1 to 5.3 of the permanent magnets 1.1 to 1.6 are amplified by the superimposition of the magnetic field 5.4 of the modification coils 2.1 to 2.6. Therefore, at low translational and/or angular velocities v and ω the resultant magnetic field 5 has a large field strength. It is assured by this that the eddy currents induced in the body 4 by the magnetic field 5, and the associated eddy current fields 6.1 and 6.2 are sufficiently strong so that in case of an acceleration the changes of the eddy current fields in the detector coils 3.1 to 3.4 induce a sufficiently large voltage.

When the moved body 4 moves at a high translational or angular velocity, the current I through the modification coils 2.1 to 2.6 is adjusted by the current regulator in such a way, that the magnetic field 5.1 to 5.3 of the permanent magnets 1.1 to 1.6 is weakened by the superimposition of the magnetic field 5.4 of the modification coils 2.1 to 2.6. Therefore, the resultant magnetic field 5 has a low field strength at low translational or angular velocities. Because of this the eddy currents in the moved body 4 are only sufficiently large so that the change in the eddy current fields induces a sufficiently large voltage in the detector coils 3.1 to 3.4 for the desired accuracy of the detectors.

The current regulator 7 required for this is provided with the translational velocity v of the moved body 4, or its angular velocity ω, as the input values depending on the type of velocity being measured. The current regulator 7 determines a current I from this, which allows an acceleration measurement with the desired accuracy, without too large an eddy current being induced by the resultant field strength of the magnetic field 5 adapted by the current I and therefore the moved body 4 being too greatly heated. In the course of the measuring process, the current I is adjusted by the current regulator in such a way that at this moment the modification coils 2.1 to 2.6 generate a constant magnetic field which must be taken into consideration when evaluating the signals from the detector coils 3.1 to 3.4, of course, for example in that the measurement signal is provided with a correction value, which is a function of the current I of the modification coils 2.1 to 2.6.

In addition, it is possible in the course of detecting the current I for the modification coils 2.1 to 2.6 to also take known effects, which distort the result of the acceleration measurement, into consideration. Among these are, for example, non-linearities of the dependence of the eddy current on the number of revolutions or the translational or angular velocity, dissonances and offsets of the eddy current sensor itself resulting from geometric deviations, different properties of the material, dependence on the temperature, or from the functional principle itself. Advantageously a characteristic curve is determined in the current generator 7 for determining the current I for the modification coils 2.1 to 2.6, which is read out as a function of the velocity. All the above noted distortions are already taken into consideration by this characteristic curve. In the course of producing the eddy current sensor, the characteristic curve is stored in a memory 8 of the current regulator 7.

The modification coils 2.1 to 2.6 can be produced by windings around the permanent magnets 1.1 to 1.6, or around possibly provided yoke structures in which the permanent magnets 1.1 to 1.6 are installed.

Figure 2:
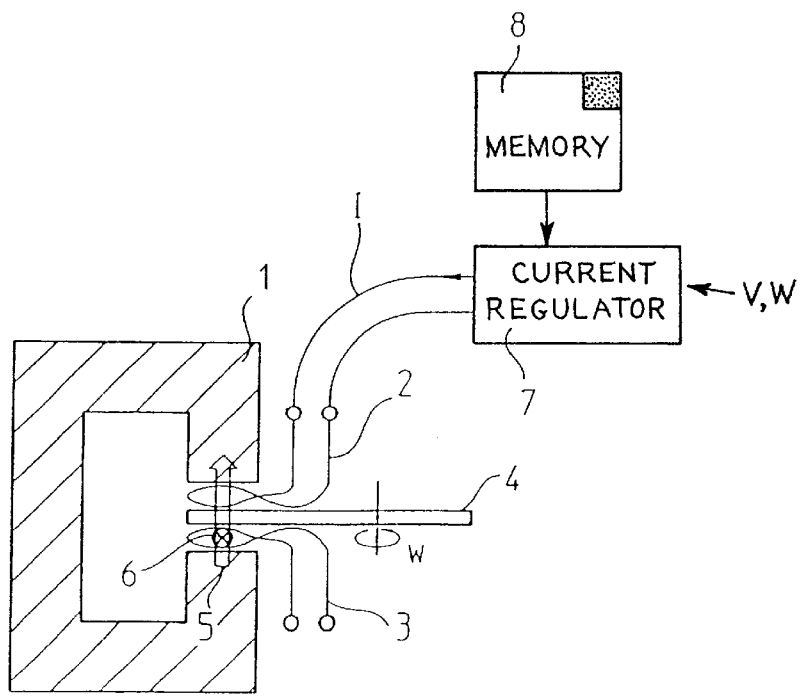
FIG. 2 represents a second embodiment of a Ferraris or eddy current sensor accordance with the present invention.

As represented in FIG. 2, the modification coils 2.1 to 2.6 can alternatively also be embodied to be planar and arranged in the area of the pole faces near the moved body 4. FIG. 2 shows a permanent magnet 1 designed as a yoke structure. A modification coil 2, which is connected with a current regulator 7, is arranged between the one pole face of the permanent magnet 1 and the moved body 4. The current regulator 7 is connected with a memory 8, in which the characteristic curve for the velocity-dependent adaptation of the current I of the modification coil 2 is stored. The magnetic field 5 is the result of the superimposition of the magnetic fields of the permanent magnet 1 and the modification coil 2. This causes eddy currents in the moved body 4, which in turn cause an eddy current field 6. In case of an acceleration of the moved body 4, the eddy currents and the magnetic field 6 caused by them are changed, so that a voltage is induced in the detector coil 3. It is unimportant here whether this is an accelerated rotational or linear movement.

The current I for the modification coil 2 is adjusted by the current regulator 7, at least as a function of the actual, or alternatively of the desired movement velocity v or ω. Since it is possible to amplify, as well as weaken, the constant magnetic field by the current I, the option arises of selecting the permanent magnet 1 to be smaller. By this it is possible to reduce not only the size, but also the weight of the eddy current sensor. Moreover, the eddy current sensor also becomes less expensive.

It is also possible by the characteristic curve of the current I of the modification coil 2, or coils 2.1 to 2.6, which is stored for the current regulator 7 in a memory 8, to compensate for geometric or material tolerances of the permanent magnets 1 and 1.1 to 1.6, in that characteristics curves are stored for the modification coils 2 or 2.1 to 2.6, which are each individually matched to the permanent magnets 1 or 1.1 to 1.6.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A method for operating an eddy current sensor, comprising:
    generating a first magnetic flux, which is essentially directed vertically with respect to a moved body;
    generating eddy currents in said moved body in response to said first magnetic flux, wherein said eddy currents generate an eddy field;
    inducing a voltage in a detector as a result of a change of said eddy field;
    superimposing a further adjustable magnetic flux on said first magnetic flux to form a resultant magnetic flux.

2. The method of claim 1, wherein said detector comprises a detector coil in which said voltage is induced.

3. The method of claim 1, further comprising generating further eddy currents from said resultant magnetic flux.

4. The method of claim 1, wherein said first magnetic flux is generated by at least one permanent magnet.

5. The method of claim 1, wherein said further adjustable magnetic flux is generated by an adjustable current in a least one modification coil.

6. The method of claim 4, wherein said further adjustable magnetic flux is generated by an adjustable current in a least one modification coil.

7. The method of claim 5, wherein said adjustable current is adjusted by said at least one modification coil as a function of a velocity of said moved body.

8. The method of claim 7, wherein said velocity is a translational velocity.

9. The method of claim 7, wherein said velocity is an angular velocity.

10. The method of claim 7, wherein said adjustable current is adjusted by said at least one modification coil for correcting non-linearities of the dependency of said eddy current from said velocity of said body.

11. The method of claim 7, wherein said adjustable current is adjusted by said at least one modification coil for correcting an offset voltage.

12. An eddy current sensor, comprising:
- an arrangement for generating a first magnetic flux, which is essentially directed vertically with respect to a moved body;
- a detector coil for detecting an eddy field in said moved body;
- a second arrangement which generates a further adjustable magnetic flux, which is superimposed on said first magnetic flux to form a resultant magnetic flux.

13. The eddy current sensor of claim 12, wherein said second arrangement for generating said further adjustable magnetic flux comprises a modification coil.

14. The eddy current sensor of claim 12, wherein said arrangement for generating said first magnetic flux comprises a permanent magnet.

15. The eddy current sensor of claim 13, wherein said arrangement for generating said first magnetic flux comprises a permanent magnet.

16. The eddy current sensor of claim 13, wherein said modification coil is connected with a current regulator.

17. The eddy current sensor of claim 15, wherein said modification coil is connected with a current regulator.

18. The eddy current sensor of claim 16, wherein said current regulator is connected with a memory.

19. The eddy current sensor of claim 17, wherein said current regulator is connected with a memory.

20. The eddy current sensor of claim 12, wherein said second arrangement adjusts said further adjustable magnetic flux as a function of a velocity of said moved body.

21. The eddy current sensor of claim 20, wherein said velocity is a translational velocity.

22. The eddy current sensor of claim 20, wherein said velocity is an angular velocity.

23. The eddy current sensor of claim 20, wherein said second arrangement corrects said further adjustable magnetic flux of non-linearities of the dependency of said eddy current from said velocity of said body.

* * * * *